(12) United States Patent
Stemmer et al.

(10) Patent No.: US 7,201,079 B2
(45) Date of Patent: Apr. 10, 2007

(54) ROTARY ACTUATOR FOR AN ADJUSTER OF A VEHICLE SEAT

(75) Inventors: Jürgen Stemmer, Remscheid (DE); Tobias Ewald, Essen (DE); Rolf Schüler, Heiligenhaus (DE); Rainer Messerschmidt, Düsseldorf (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/352,905

(22) Filed: Feb. 13, 2006

(65) Prior Publication Data

US 2006/0125300 A1 Jun. 15, 2006

Related U.S. Application Data

(63) Continuation of application No. PCT/EP2004/009525, filed on Aug. 26, 2004.

(30) Foreign Application Priority Data

Sep. 5, 2003 (DE) ................. 103 40 997

(51) Int. Cl.
*G05G 1/00* (2006.01)
(52) U.S. Cl. ........................ 74/491; 297/353
(58) Field of Classification Search .................. 74/491, 74/25; 297/353
See application file for complete search history.

(56) References Cited

U.S. PATENT DOCUMENTS

| 3,897,608 | A | | 8/1975 | Impicciche |
| 4,098,135 | A | | 7/1978 | Werner |
| 4,200,333 | A | * | 4/1980 | Cremer et al. ............... 297/362 |
| 4,222,474 | A | | 9/1980 | Choudhury et al. |
| 4,598,947 | A | | 7/1986 | Fourrey et al. |
| 4,856,763 | A | | 8/1989 | Brodersen et al. |
| 5,159,847 | A | | 11/1992 | Williams et al. |
| 5,239,891 | A | | 8/1993 | Stocker |
| 5,295,730 | A | * | 3/1994 | Rees ........................ 297/361.1 |
| 5,542,772 | A | * | 8/1996 | Reuber et al. ................ 403/97 |
| 5,634,380 | A | | 6/1997 | Scholz et al. |
| 5,816,656 | A | | 10/1998 | Hoshihara et al. |
| 5,899,533 | A | | 5/1999 | Tatematsu et al. |
| 5,934,753 | A | | 8/1999 | Lange |
| 6,095,312 | A | | 8/2000 | Schumann |

(Continued)

FOREIGN PATENT DOCUMENTS

DE 44 00 910 A1 7/1995

(Continued)

*Primary Examiner*—David M. Fenstermacher
(74) *Attorney, Agent, or Firm*—Womble Carlyle Sandridge & Rice, PLLC

(57) ABSTRACT

In the case of a rotary actuator for an adjuster of a vehicle seat, in particular of a motor vehicle seat, having a manually actuatable operating element (7), a transmission gearing (11) on which the operating element (7) acts when actuated, and an output element (9) which is rotated at least intermittently by the transmission gearing (11) and, during a rotation, drives the adjuster (3), the transmission gearing (11) changing during the actuation by the operating element (7) from a higher transmission ratio to a lower transmission ratio, during the actuation by the operating element (7) the transmission gearing (11) runs through two phases during which the transmission ratios are constant in each case.

20 Claims, 3 Drawing Sheets

U.S. PATENT DOCUMENTS

| | | |
|---|---|---|
| 6,102,480 A | 8/2000 | Asano |
| 6,142,569 A | 11/2000 | Kidokoro et al. |
| 6,283,886 B1 | 9/2001 | Schumann |
| 6,318,805 B1 | 11/2001 | Asano |
| 6,422,651 B1 | 7/2002 | Mühlberger et al. |
| 6,592,186 B1 | 7/2003 | Mühlberger et al. |
| 6,619,743 B1 | 9/2003 | Scholz et al. |
| 6,883,869 B2 | 4/2005 | Liu et al. |
| 2002/0053824 A1 | 5/2002 | Angermann et al. |
| 2003/0116689 A1 | 6/2003 | Schuler et al. |
| 2004/0195890 A1 | 10/2004 | Liu et al. |
| 2005/0067871 A1 | 3/2005 | Schuler et al. |

FOREIGN PATENT DOCUMENTS

| | | |
|---|---|---|
| DE | 195 08 328 A1 | 9/1996 |
| DE | 195 17 441 C1 | 10/1996 |
| DE | 195 33 453 A1 | 3/1997 |
| DE | 195 40 631 A1 | 5/1997 |
| DE | 197 37 637 A1 | 3/1998 |
| DE | 197 05 485 C1 | 4/1998 |
| DE | 196 53 722 C2 | 7/1998 |
| DE | 198 02 028 C1 | 5/1999 |
| DE | 198 16 248 C1 | 10/1999 |
| DE | 198 47 081 A1 | 4/2000 |
| DE | 100 52 089 C1 | 2/2002 |
| DE | 100 57 377 C1 | 2/2002 |
| DE | 102 60 548 A1 | 7/2004 |
| DE | 103 48 823 A1 | 6/2005 |
| EP | 0 844 134 B1 | 5/1998 |
| EP | 0 931 690 B1 | 7/1999 |
| EP | 1 002 691 A2 | 5/2000 |
| FR | 2 314 535 | 1/1977 |
| FR | 2 560 832 | 9/1985 |
| GB | 893 419 | 4/1962 |
| GB | 2 117 441 A | 10/1983 |
| WO | WO 02/34565 A1 | 5/2002 |
| WO | WO 2004/056605 A1 | 7/2004 |

* cited by examiner

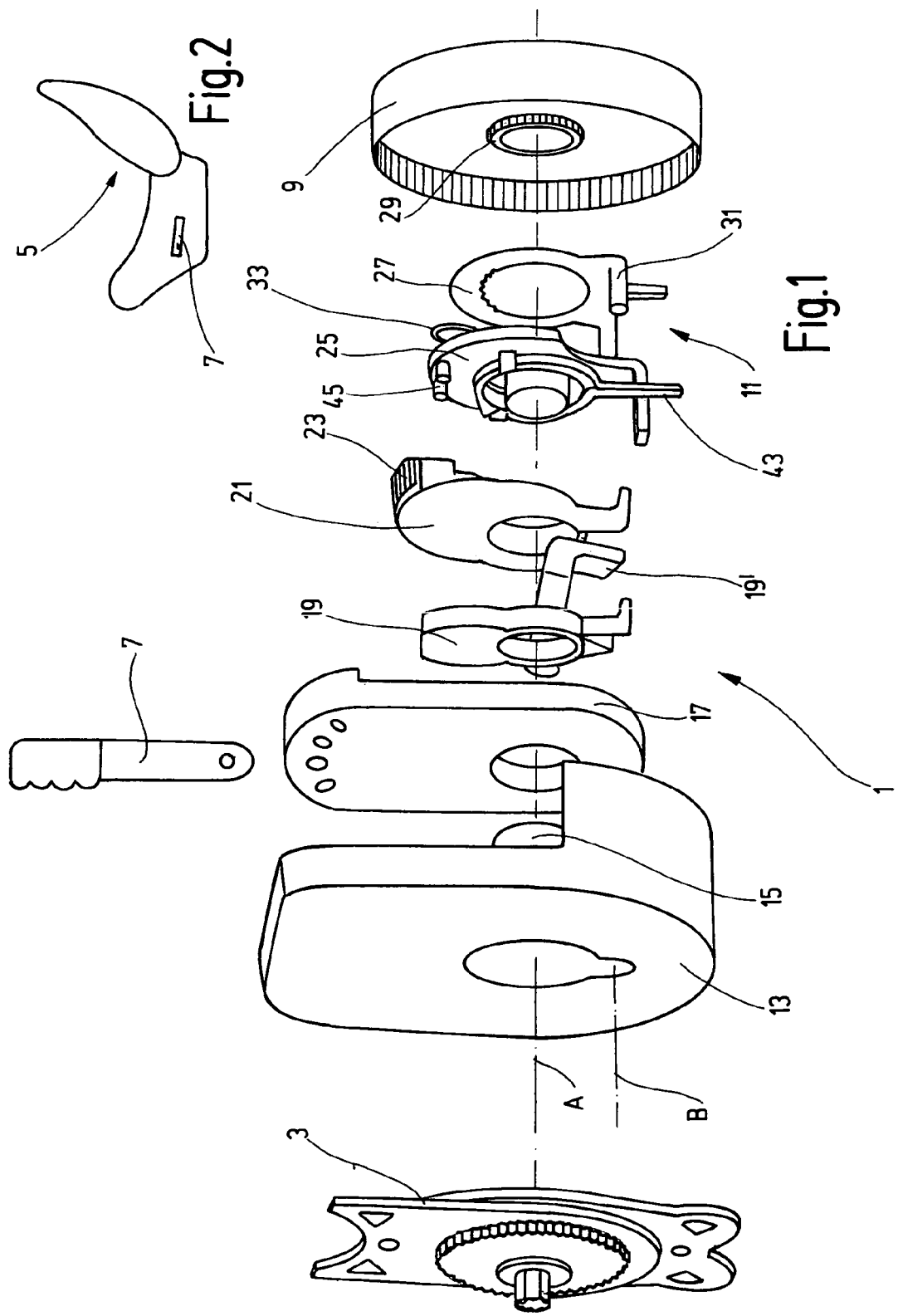

ROTARY ACTUATOR FOR AN ADJUSTER OF A VEHICLE SEAT

CROSS-REFERENCE TO RELATED APPLICATION

The present application is a continuation of International Application PCT/EP2004/009525, which was filed Aug. 26, 2004. The entire disclosure of PCT/EP2004/009525 is incorporated herein by reference.

BACKGROUND OF THE INVENTION

The present invention relates to a rotary actuator for an adjuster of a vehicle seat, in particular of a motor vehicle seat, with the rotary actuator having: a manually actuatable operating element; a transmission gearing on which the operating element acts when actuated; and an output element that is rotated at least intermittently by the transmission gearing and, during a rotation, drives the adjuster, with the transmission gearing changing during the actuation by the operating element from a higher transmission ratio to a lower transmission ratio.

In the case of a rotary actuator of the above-described type that is disclosed in DE 100 57 377 C1 (which is a member of the same patent family as US 2003/0116689) and has levers in rolling contact with one another, a gearing is provided which, when there is a rise in the driving torque, for example in response to an increased counterforce of the adjuster to be driven, provides a continuous reduction of the transmission ratio in order to avoid an overload. If the adjuster which the rotary actuator is to drive is provided with elements which adjust without any play (e.g., springs), then before the actual adjusting movement the path covered by the elements which adjust without any play has to be passed through counter to the force thereof. If a large actuating path for the operating element is not available, this efficiency of the rotary actuator that is initially and subjectively perceived to be low may be regarded by the user as being uncomfortable.

BRIEF SUMMARY OF SOME ASPECTS OF THE INVENTION

An aspect of the present invention is the provision of improvements to a rotary actuator of the type mentioned above. In accordance with an aspect of the present invention, a rotary actuator for an adjuster of a vehicle seat, in particular of a motor vehicle seat, has a manually actuatable operating element, a transmission gearing on which the operating element acts when actuated, and an output element which is rotated at least intermittently by the transmission gearing. The rotation of the output element is for driving the adjuster. The transmission gearing changes during the actuation by the operating element from a higher transmission ratio to a lower transmission ratio. During the actuation by the operating element, the transmission gearing runs through two phases during which the transmission ratios are constant in each case.

Because during the actuation by the operating element the transmission gearing runs through two phases during which the transmission ratios are constant in each case, it is possible in the first phase, i.e. during the initial movement of the operating element out of its inoperative position, for the "ineffective" path or the path perceived as such (e.g., prior to bringing about the actual adjusting movement of the adjuster), as occurs because of tolerances, play and elements adjusting in a manner free from play, to be traveled through (e.g., for tolerances to be taken up) with the higher transmission ratio rapidly and without a large operating path, so that the adjuster is preferably free from play internally. In the second phase, i.e. during the further movement of the operating element into a deflected position, it is then possible, with the lower transmission ratio, for which a relatively large portion of the operating path is available, for the full driving force to be transmitted in order preferably to bring about the actual adjusting movement. The subjective impression of a large actuating path with low efficiency is significantly reduced. The actuating path for the adjusting movement is not restricted to a small angular range. The transmission gearing preferably has components which, during the first phase, execute a movement relative to one another in order to bring about the higher transmission ratio, and, during the second phase, together pivot about a main axis in order to transmit the driving force.

In one preferred embodiment, the transmission gearing has, as one of the components mentioned in the immediately preceding sentence, a support plate or another support which remains in a defined inoperative position during the first phase, preferably being held by the prestressing of (e.g., the bias provided by) a torque definition spring, with the second phase beginning when the driving force overcomes the prestressing of the torque definition spring. As a further component, the transmission gearing preferably has a toothed segment or another element which can be coupled and is radially displaceable and pivotable preferably relative to the support plate, for example by a combination of a slot, bolt and spring.

If the toothed segment is acted upon by the operating element, the toothed segment can, during the first phase, couple with the output element by way of the radial displacement, and drive the output element by way of the pivoting movement. For the coupling, a toothed ring integrally formed on the output element, a gearwheel connected in a rotationally fixed manner to the output element, or a comparable component which can interact with the toothed segment, can be provided. The higher transmission ratio is provided by way of different radii of curvature. The pivoting movement of the toothed segment during the first phase takes place preferably about a fixed pivot point, for example a bolt, that is arranged on the support plate and can be used at the same time for guidance for the radial displacement. If, in the second phase, the support plate then begins to pivot about the main axis, a joint pivoting movement of all of the components of the transmission gearing about the main axis arises automatically.

The rotary actuator according to the invention, which is used as an interface between the user and the adjuster, can differ in design as a function of how the rotary actuator is to be applied. For example, the rotary actuator can be rotated continuously with, for example, a hand wheel, or the rotary actuator can be rotated discontinuously as a step-by-step mechanism.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 shows a partially schematized, exploded view of the exemplary embodiment, FIG. 2 shows a schematized view of a vehicle seat.

DETAILED DESCRIPTION OF EXEMPLARY EMBODIMENT

Figure 3:
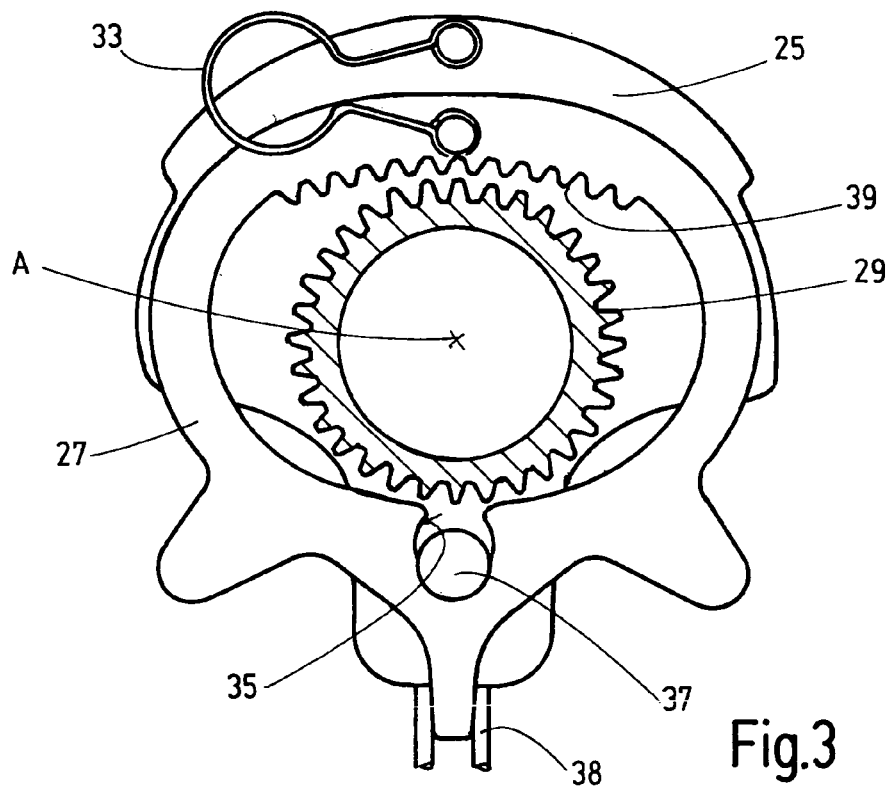
FIG. 3 shows a view, illustrated partially cutaway, of a transmission gearing in the inoperative position.
Figure 4:
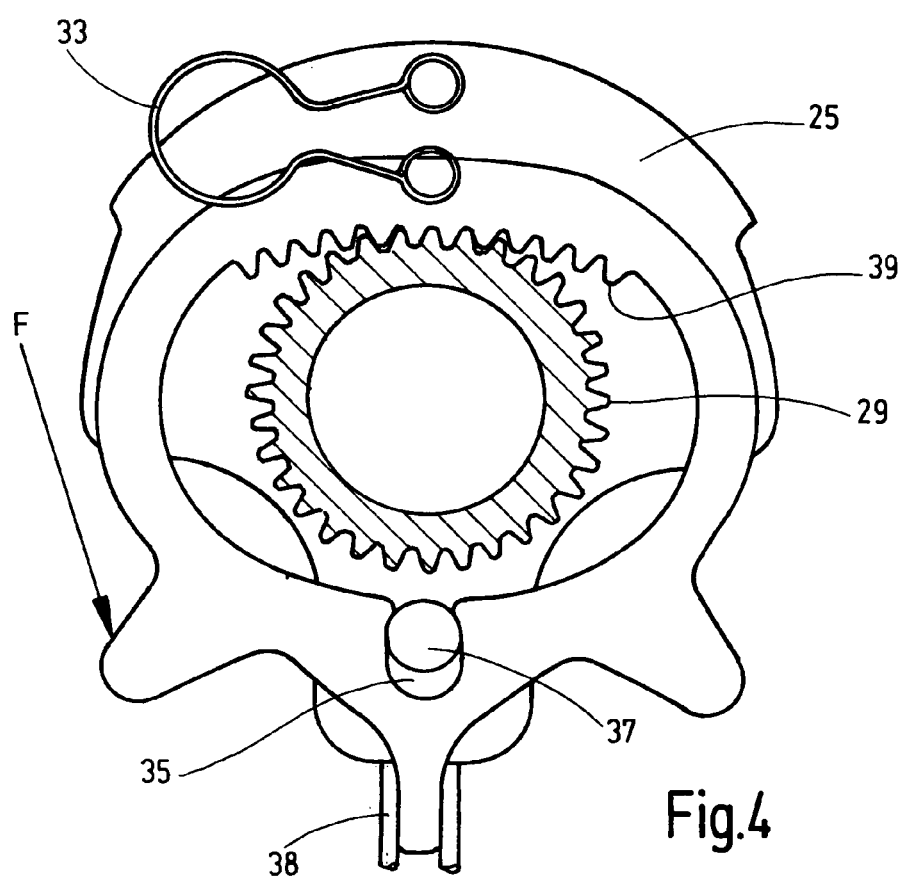
FIG. 4 shows a view corresponding to FIG. 3 of the transmission gearing during the coupling at the beginning of a first phase.
Figure 5:
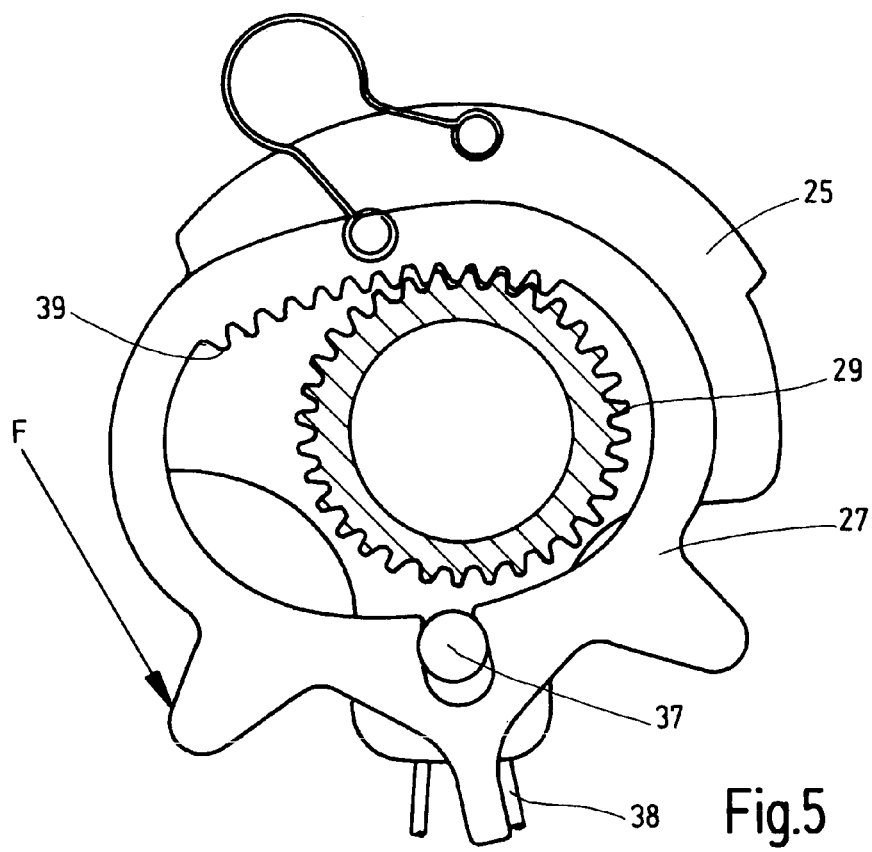
FIG. 5 shows a view corresponding to FIG. 4 of the transmission gearing at the end of the first phase.
Figure 6:
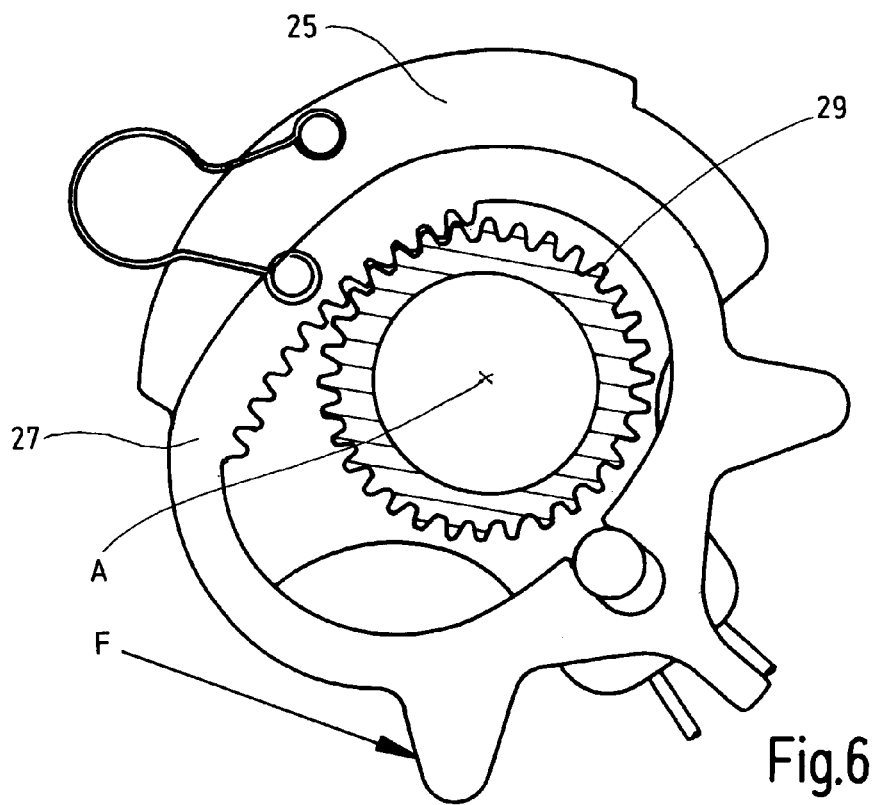
FIG. 6 shows a view corresponding to FIG. 5 of the transmission gearing during a second phase.

A manual rotary actuator 1, which is for actuating an adjuster 3 of a vehicle seat 5 in a motor vehicle, has a manually actuatable operating element 7 and an output element 9. In the present case, the operating element 7 is a hand lever. The output element 9 is in the form of a wheel that can be indirectly rotated in response to the operating element 7 being operated. The rotational movement of the output element 9 drives the adjuster 3. In accordance with the exemplary embodiment, the actuator 1 functions as a step-by-step mechanism for actuating a height adjuster. A transmission gearing 111 is arranged in the rotary actuator 1, operatively between the operating element 7 and the output element 9. In accordance with the invention, the transmission gearing 11 provides a high transmission ratio during an initial movement of the operating element 7 out of the inoperative position. This provision of the high transmission ratio during the initial movement of the operating element 7 is also referred to below as the first phase. The play in the adjuster 3 is eliminated (e.g., taken up) during the first phase. During the further movement of the operating element 7, referred to below as the second phase, the transmission gearing 11 ensures a direct transmission ratio of 1:1. The output side of the adjuster 3 is moved during the second phase.

In detail, the rotary actuator 1 is provided with a housing 13 having a bearing journal 15 that defines a main axis A, and supports an external involute element 17. The external involute element 17 is connected to the operating element 7, can be pivoted about a secondary axis B parallel to the main axis A, and largely encloses the bearing journal 15. Mounted successively on the bearing journal 15 are: an internal involute element 19, which is moved by the external involute element 17; a thrust element support 21, which guides a thrust element 23; a support plate 25; and an the output element 9, which is connected in a rotationally fixed manner to the adjuster 3. A toothed segment 27 is arranged between the support plate 25 and the output element 9. The support plate 25, the toothed segment 27 and a toothed ring 29 integrally formed on the output element 9 define the transmission gearing 11. FIG. 3 shows the inoperative position of the transmission gearing 11.

During a pivoting movement of the operating element 7 out of the inoperative position, the external involute element 17 pivots and, by way of a rolling-contact movement, causes the internal involute element 19 to pivot. The internal involute element 19 acts, depending on the pivoting direction, by way of one of two arms 19' upon one of two journals 31 of the toothed segment 27 with a driving force F. In the first phase, the toothed segment 27 is displaced radially counter to the force of a first restoring spring 33, with the toothed segment 27 being guided by a guide spring 38 and a bearing bolt 37. This bearing bolt 37 of the support plate 25 extends into a slot 35 of the toothed segment 27. The support plate 25 remains inoperative during the first phase.

A toothing 39 of the toothed segment 27 enters into engagement with the toothed ring 29 of the output element 9, i.e. the toothed segment 27 couples. With the further movement of the toothed segment 27, the toothed segment 27 pivots about the bearing bolt 37. This pivoting of the toothed segment 27 about the bearing bolt 37 takes place counter to the force of the guide spring 38, which also serves as a second restoring spring. The bearing bolt 37 serves as a pivoting point and is arranged offset with respect to the main axis A. In the process, the toothing 39 is in rolling contact with the toothed ring 29, as a result of which the output element 9 rotates. An "ineffective" path caused by internal play in the adjuster 3 is passed through until the adjuster 3 is free from play internally (e.g., tolerances are taken up). In the present exemplary embodiment, the radius of curvature of the toothing 39, i.e. its root circle, is four times as large as the radius of curvature of the toothed ring 29, so that there is a transmission ratio of 4:1. As a result, the "ineffective" path of the adjuster 3 is completely passed through (e.g., tolerances are taken up) with just a small pivoting angle.

A torque definition spring 43 acts as a third restoring spring, is supported on the housing 13, and keeps the support plate 25 inoperative during the first phase. The second phase begins when triggered by the counterforce built up by the adjuster 3. That is, after passing through the "ineffective" path (e.g., after tolerances are taken up) the driving force F exceeds the prestressing of (e.g., the biasing provided by) the torque definition spring 43. The support plate 25 then rotates about the main axis A, with the thrust element 23 being pushed radially outward by one of two axially protruding, integrally formed pins 45 of the support plate 25 until the thrust element 23 reaches into an internal toothing of the output wheel 9. The drive of the adjuster 3 then takes place at a high transmission of torque by way of the output wheel 9, i.e. the adjusting movement of the adjuster 3 takes place. If the force on the operating element 7 decreases in a deflected position or is reversed, for example after the end stop has been reached and the operating element 7 has returned, the various restoring springs 33, 38 and 43 ensure that the components other than the output element 9 resume their starting position which they had already taken up in the inoperative position. In particular, the restoring spring 33 ensures that the toothed segment 27 becomes disengaged again from the toothed ring 29, so that the output element 9 does not experience a restoring movement.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A rotary actuator for an adjuster of a vehicle seat, the rotary actuator comprising:

an operating element for being manually set into motion;

an output element for rotationally driving the adjuster; and a transmission gearing operatively positioned between the operating element and the output element for at least intermittently rotatably driving the output element in response to the operating element being in motion, wherein the transmission gearing is configured for operating through two phases while rotatably driving the output element in response to the operating element being in motion, the operating of the transmission gearing through the two phases includes the transmission gearing changing from a higher constant transmission ratio to a lower constant transmission ratio, the transmission gearing is configured, throughout a first of the two phases, for driving the output element at the higher constant transmission ratio in response to the operating element being in motion, and the transmission gearing is configured, throughout a second of the two phases, for driving the output element at the lower constant transmission ratio in response to the operating element being in motion.

2. The rotary actuator according to claim 1, wherein the transmission gearing has at least some components that are operatively associated with one another so that:

said components execute a movement relative to one another during the first phase, and said components together pivot about a main axis during the second phase.

3. The rotary actuator according to claim 2, wherein one of said components of the transmission gearing is a support plate, and the support plate remains inoperative during the first phase.

4. The rotary actuator according to claim 2, wherein one of said components of the transmission gearing is a toothed segment, and the transmission gearing is operative for:

coupling the toothed segment with the output element during the first phase in response to the operating element being in motion, and driving the output element with the toothed segment during the first phase in response to the operating element being in motion.

5. The rotary actuator according to claim 4, wherein:

another of said components of the transmission gearing is a support plate;

the support plate remains inoperative during the first phase; and the transmission gearing is operative so that:

the coupling of the toothed segment with the output element comprises the toothed segment carrying out a radial displacement relative to the support plate during the first phase in response to the operating element being in motion, and the driving of the output element with the toothed segment comprises the toothed segment carrying out a radial displacement relative to the support plate during the first phase in response to the operating element being in motion.

6. The rotary actuator according to claim 5, wherein the toothed segment includes a slot into which a bearing bolt extends for guiding the radial displacement of the toothed segment relative to the support plate.

7. The rotary actuator according to claim 4, wherein:

the transmission gearing includes a toothed ring that is operatively connected to the output element for rotating with the output element;

the transmission gearing is operative so that the coupling of the toothed segment with the output element comprises toothing of the toothed segment engaging with the toothed ring; and the toothing of the toothed segment has a greater radius of curvature than the toothed ring.

8. The rotary actuator according to claim 3, further comprising a torque definition spring that is operatively associated with the support plate:

for keeping the support plate inoperative during the first phase, and so that the second phase begins when biasing provided by the torque definition spring is overcome by a driving force.

9. The rotary actuator according to claim 1 in combination with the adjuster, wherein the rotary actuator is operatively connected to the adjuster for:

eliminating play in the adjuster during the first phase, and driving the adjuster during the second phase, so that the adjuster provides an output motion during the second phase.

10. The combination according to claim 9 further in combination with the vehicle seat, wherein the output motion provided by the adjuster during the second phase is for adjusting the vehicle seat.

11. The rotary actuator according to claim 3, wherein another of said components of the transmission gearing is a toothed segment, and the transmission gearing is operative for:

coupling the toothed segment with the output element during the first phase in response to the operating element being in motion, and driving the output element with the toothed segment during the first phase in response to the operating element being in motion.

12. The rotary actuator according to claim 5, wherein:

the transmission gearing includes a toothed ring that is operatively connected to the output element for rotating with the output element;

the transmission gearing is operative so that the coupling of the toothed segment with the output element comprises toothing of the toothed segment engaging with the toothed ring; and the toothing of the toothed segment has a greater radius of curvature than the toothed ring.

13. The rotary actuator according to claim 6, wherein:

the transmission gearing includes a toothed ring that is operatively connected to the output element for rotating with the output element;

the transmission gearing is operative so that the coupling of the toothed segment with the output element comprises toothing of the toothed segment engaging with the toothed ring; and the toothing of the toothed segment has a greater radius of curvature than the toothed ring.

14. The rotary actuator according to claim 4, further comprising a torque definition spring that is operatively associated with the support plate:

for keeping the support plate inoperative during the first phase, and so that the second phase begins when biasing provided by the torque definition spring is overcome by a driving force.

15. The rotary actuator according to claim 5, further comprising a torque definition spring that is operatively associated with the support plate:

for keeping the support plate inoperative during the first phase, and so that the second phase begins when biasing provided by the torque definition spring is overcome by a driving force.

16. The rotary actuator according to claim 6, further comprising a torque definition spring that is operatively associated with the support plate:

for keeping the support plate inoperative during the first phase, and so that the second phase begins when biasing provided by the torque definition spring is overcome by a driving force.

17. The rotary actuator according to claim 7, further comprising a torque definition spring that is operatively associated with the support plate:
   for keeping the support plate inoperative during the first phase, and
   so that the second phase begins when biasing provided by the torque definition spring is overcome by a driving force.

18. The rotary actuator according to claim 3, further comprising a torque definition spring that is operatively associated with the support plate:
   for keeping the support plate inoperative during the first phase, and
   so that the second phase begins when biasing provided by the torque definition spring is overcome by a driving force.

19. The rotary actuator according to claim 3, further comprising a torque definition spring that is operatively associated with the support plate:
   for keeping the support plate inoperative during the first phase, and
   so that the second phase begins when biasing provided by the torque definition spring is overcome by a driving force.

20. The rotary actuator according to claim 3, further comprising a torque definition spring that is operatively associated with the support plate:
   for keeping the support plate inoperative during the first phase, and
   so that the second phase begins when biasing provided by the torque definition spring is overcome by a driving force.

* * * * *